US006965100B2

(12) United States Patent
Kim

(10) Patent No.: US 6,965,100 B2
(45) Date of Patent: Nov. 15, 2005

(54) METHOD FOR CONTROLLING OUTPUT POWER OF A COMBINATION HOOD AND MICROWAVE OVEN

(75) Inventor: Seog-tae Kim, Changwon Kyongnam (KR)

(73) Assignee: LG Electronics Inc., Seoul (KR)

(*) Notice: Subject to any disclaimer, the term of this patent is extended or adjusted under 35 U.S.C. 154(b) by 193 days.

(21) Appl. No.: 10/229,213

(22) Filed: Aug. 28, 2002

(65) Prior Publication Data

US 2003/0042254 A1 Mar. 6, 2003

(30) Foreign Application Priority Data

Aug. 30, 2001 (KR) ........................................ 2001-52745

(51) Int. Cl.[7] .................................................. H05B 6/68

(52) U.S. Cl. ....................... 219/702; 219/715; 219/757; 219/760

(58) Field of Search ................................ 219/757, 702, 219/720, 715, 716, 681, 760, 506; 126/21 A, 299 R

(56) References Cited

U.S. PATENT DOCUMENTS 6,396,038 B1 * 5/2002 Lee et al. ................... 219/757
6,414,289 B1 * 7/2002 Lee et al. ................... 219/757
6,444,965 B1 * 9/2002 Ha et al. .................... 219/702

FOREIGN PATENT DOCUMENTS

JP 58-13938 * 1/1983
KR 100265646 B1 6/2000

* cited by examiner

*Primary Examiner*—Philip H. Leung
(74) *Attorney, Agent, or Firm*—Fleshner & Kim, LLP.

(57) ABSTRACT

The present invention relates to an apparatus and method for controlling output power of a combination hood and microwave oven, and more particularly, to an apparatus and method for controlling power of a combination hood and microwave oven, wherein an output level of a high voltage transformer for generating a high voltage can be adjusted. According to the combination hood and microwave oven of the present invention, the electric power supplied to the high voltage transformer can be increased by temporarily turning off the parts (limited to the components which can be controlled separately from the microwave oven function), such as the vent fan or the electric indicator lamp, having large power consumption. Thus, the output power level thereof can be increased. Therefore, there are advantages in that the quick cooking can be made and cooking performance can be improved due to the high output of the transformer, when the user intends to make the quick cooking with the high output power.

15 Claims, 10 Drawing Sheets

METHOD FOR CONTROLLING OUTPUT POWER OF A COMBINATION HOOD AND MICROWAVE OVEN

BACKGROUND OF THE INVENTION

1. Field of the Invention

The present invention relates to an apparatus and method for controlling output power of a combination hood and microwave oven, and more particularly, to an apparatus and method for controlling power of a combination hood and microwave oven, wherein an output level of a high voltage transformer for generating a high voltage can be adjusted.

2. Background of Invention

Generally, a combination hood and microwave oven generates a high-frequency output power lower than that of a table microwave oven. This is because there is a limitation on the usable amount of current in the combination hood and microwave oven and the limited amount of current should be distributed into those for use in drive of a vent fan, an electric lamp and all components for controlling the microwave oven such as a turntable and a magnetron.

However, the table microwave oven does not require a certain amount of current for use in the drive of the vent fan and electric lamp contrary to the combination hood and microwave oven. Therefore, in the case of the table microwave oven, a greater amount of current can be assigned to the magnetron as compared with the combination hood and microwave oven. Consequently, the high-frequency output power of the table microwave oven can be generated greater than that of the combination hood and microwave oven.

FIG. 1 shows a control configuration for control of output power of a conventional combination hood and microwave oven.

In the conventional combination hood and microwave oven, as shown in the figure, a vent fan 9, an electric cook top lamp 13, a turntable 17 and a high voltage transformer 21 for generating a high-frequency output voltage for a magnetron (not shown) are connected in parallel to an electric power supply inputted through a power supply terminal 1 so that they are supplied with electric power.

The control configuration also has additional control relays 7, 11, 15 and 19 so that supply of the electric power can be made through control of the relays.

The microwave oven constructed as such is set to use the rated amount of current, and a fuse 3 selected depending on the rated amount of current is connected to the power supply terminal 1. Thus, it is constructed in such a manner that if the amount of current produced from such a configuration exceeds a predetermined value of the fuse 3, the fuse 3 is gone to cut off the supply of the electric power.

Meanwhile, a conventional high voltage transformer (HVT) 21 is constructed such that a voltage V2 at a secondary side of the transformer 21 is determined according to a voltage V1 applied to a primary side of the transformer, as shown in FIG. 2. Further, the high voltage transformer 21 is designed in consideration of remaining power consumption except power consumption related to use of respective components of the combination hood and microwave oven shown in FIG. 1 from the electric power usable for the microwave oven.

That is, when the electric power is applied to the primary side of the high voltage transformer 21, a high voltage is induced at the secondary side thereof. Such an induced voltage is transferred to the magnetron (not shown) which in turn oscillates. At this time, the magnitude of output power of the magnetron is determined according to the voltage at the secondary side of the high voltage transformer 21. In other words, the higher the induced voltage at the secondary side is, the higher output power of a high-frequency wave generated by the magnetron is.

Furthermore, the voltage at the secondary side of the high voltage transformer 21 is obtained from the following relationship (1):

$$n2/n1=V2/V1, \quad (1)$$

where V1 is the voltage at the primary side of the transformer, n1 is the number of windings of a primary coil, V2 is the voltage at the secondary side of the transformer, and n2 is the number of windings of a secondary coil.

Therefore, in order to obtain a higher voltage at the secondary side of the high voltage transformer 21, the transformer should be designed such that the number of windings of the secondary coil is increased or the number of windings of the primary coil is decreased.

Through such a process, the high voltage transformer for use in the conventional combination hood and microwave oven is designed in consideration of remaining power consumption except power consumption of all components within the microwave oven. The high voltage generated by the high voltage transformer of the combination hood and microwave oven designed as such is inevitably lower than that generated by a high voltage transformer provided in the conventional table microwave oven. As described above, this is because the table microwave oven does not include components such as the vent fan and the electric lamp contrary to the combination hood and microwave oven.

Thus, the conventional combination hood and microwave oven has the following problems.

First, since the high voltage to be supplied to the magnetron is inevitably lower than that of the table microwave oven, the conventional combination hood and microwave oven inevitably has low cooking performance upon cooking in the microwave oven which requires very high output power. In particular, there is inconvenience in that it takes a long time to perform cooking.

Second, even though all the components are not always operated at a time in the combination hood and microwave oven, the high voltage transformer always generates a constant output level due to its product specification. This leads to a problem of inefficient use of the product.

Third, although an inverter for controlling the high output power has been employed in the combination hood and microwave oven in connection with the above matter, this results in increase of its production costs, thereby increasing a burden of a consumer on its price and leading to decrease in purchasing power of the consumer for the product.

SUMMARY OF INVENTION

The present invention is conceived to solve the above problems. The present invention proposes a configuration in which a current state of a combination hood and microwave oven is checked to adjust an output level of a high voltage transformer. This can be achieved by adjusting the number of windings of a primary or secondary coil of the high voltage transformer depending on whether a vent motor or electric lamp is in operation.

Therefore, an object of the present invention is to provide an apparatus and method for controlling output power of a combination hood and microwave oven, wherein an output level generated by a high voltage transformer of the combination hood and microwave oven can be variably controlled.

According to one aspect of the present invention for achieving the above object, there is provided an apparatus for controlling output power of a combination hood and microwave oven with a vent fan for ventilation, comprising a high voltage transformer configured to generate high voltages having different amplitudes at a secondary side of the high voltage transformer within a range of power consumption of the microwave oven; a magnetron for outputting high-frequency waves with the high voltages induced at the secondary side of the high voltage transformer; one or more switches for controlling current passages at a primary side of the high voltage transformer by differently controlling the number of windings at the primary side of the high voltage transformer; and a control unit for variably adjusting an output level of the high voltage transformer by selectively controlling operations of the one or more switches.

According to another aspect of the present invention, there is provided an apparatus for controlling output power of a combination hood and microwave oven with a vent fan for ventilation, comprising a high voltage transformer configured to generate high voltages having different magnitudes at a secondary side of the high voltage transformer within a range of power consumption of the microwave oven; a magnetron for outputting high-frequency waves with the high voltages induced at the secondary side of the high voltage transformer; one or more switches for controlling the output voltages at the secondary side of the high voltage transformer by differently controlling the number of windings at the secondary side of the high voltage transformer; and a control unit for variably adjusting an output level of the high voltage transformer by selectively controlling operations of the one or more switches.

The control unit may adjust the output level of the high voltage transformer depending on whether the vent fan is operated.

The control unit may forcibly interrupt the use of the vent fan depending on the kind of cooking using the magnetron.

The control unit may inform a user that the vent fan is not in use when the use of the vent fan is forcibly interrupted.

According to a further aspect of the present invention, there is provided a method for controlling output power of a combination hood and microwave oven including a vent fan for ventilation, a high voltage transformer configured to generate high voltages having different magnitudes at a secondary side of the high voltage transformer within a range of power consumption of the microwave oven, a magnetron for outputting high-frequency waves with the high voltages induced at the secondary side of the high voltage transformer and a plurality of switches for controlling current passages at a primary side of the high voltage transformer by differently controlling the number of windings at the primary side of the high voltage transformer, comprising the first step of selecting a cooking menu; the second step of determining whether the vent fan is operated; and the third step of operating a switch for a first high, maximum output level of the high voltage transformer when the vent fan is not in operation but another switch for a second high output level lower than the first high output level of the high voltage transformer when the vent fan is in operation. The third step is performed while monitoring the operation of the vent fan during a predetermined cooking time for the selected cooking menu.

According to a still further aspect of the present invention, there is provided a method for controlling output power of a combination hood and microwave oven including a vent fan for ventilation, a high voltage transformer configured to generate high voltages having different magnitudes at a secondary side of the high voltage transformer within a range of power consumption of the microwave oven, and a magnetron for outputting high-frequency waves with the high voltages induced at the secondary side of the high voltage transformer, comprising the steps of selecting a cooking menu; determining whether the selected cooking menu can be performed under high output power control; and controlling the cooking menu by producing a maximum output level of the high voltage transformer during a predetermined period of time when it is determined in the determination step that the cooking menu can be performed under the high output power control or producing a lower output level of the high voltage transformer during the predetermined period of time when it is determined in the determination step that the cooking menu cannot be performed under the high output power control.

According to a still further aspect of the present invention, there is provided a method for controlling output power of a combination hood and microwave oven including a vent fan for ventilation, a high voltage transformer configured to generate high voltages having different magnitudes at a secondary side of the high voltage transformer within a range of power consumption of the microwave oven, and a magnetron for outputting high-frequency waves with the high voltages induced at the secondary side of the high voltage transformer, comprising the steps of selecting a cooking menu; performing cooking by producing a maximum output level of the high voltage transformer during a predetermined period of time according to an algorithm of the selected cooking menu; and switching the output level of the high voltage transformer to a lower value and continuing to perform the cooking when a predetermined period of time has passed according to the algorithm of the selected cooking menu.

According to a still further aspect of the present invention, there is provided a method for controlling output power of a combination hood and microwave oven including a vent fan for ventilation, a high voltage transformer configured to generate high voltages having different magnitudes at a secondary side of the high voltage transformer within a range of power consumption of the microwave oven, and a magnetron for outputting high-frequency waves with the high voltages induced at the secondary side of the high voltage transformer, comprising the steps of selecting a cooking menu; if the selected cooking menu is a cooking menu requiring high output power control, performing cooking with a maximum output level of the high voltage transformer; monitoring an operation of the vent fan; and forcibly interrupting the operation of the vent fan if an operation signal of the vent fan is inputted while the cooking is performed.

The method may further comprise the step of informing a user that the vent fan is not operated if the operation of the vent fan is forcibly interrupted.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION FOR PREFERRED EMBODIMENT

Hereinafter, an apparatus and method for controlling output power of a combination hood and microwave oven according to the present invention will be explained in detail with reference to the accompanying drawings.

Figure 1:
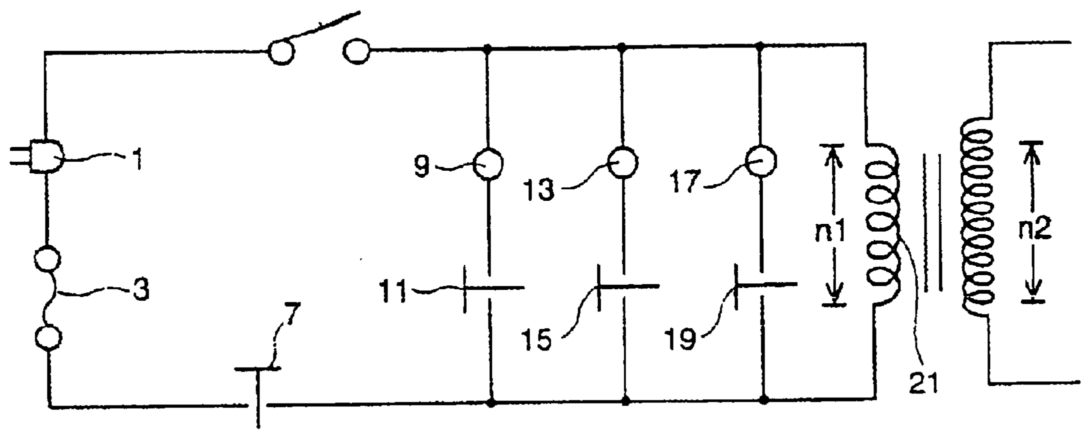
FIG. 1 is a circuit diagram for control of output power of a conventional combination hood and microwave oven.
Figure 2:
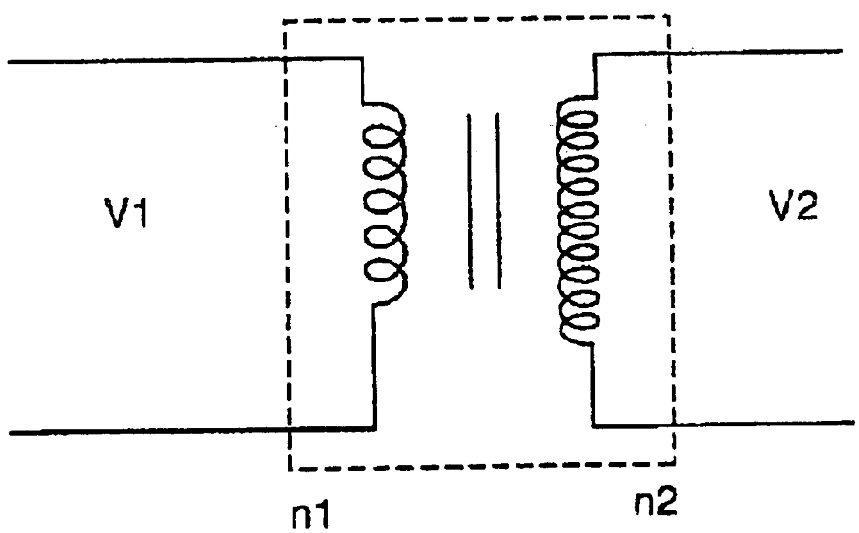
FIG. 2 is a view showing a configuration of a conventional high voltage transformer.
Figure 3:
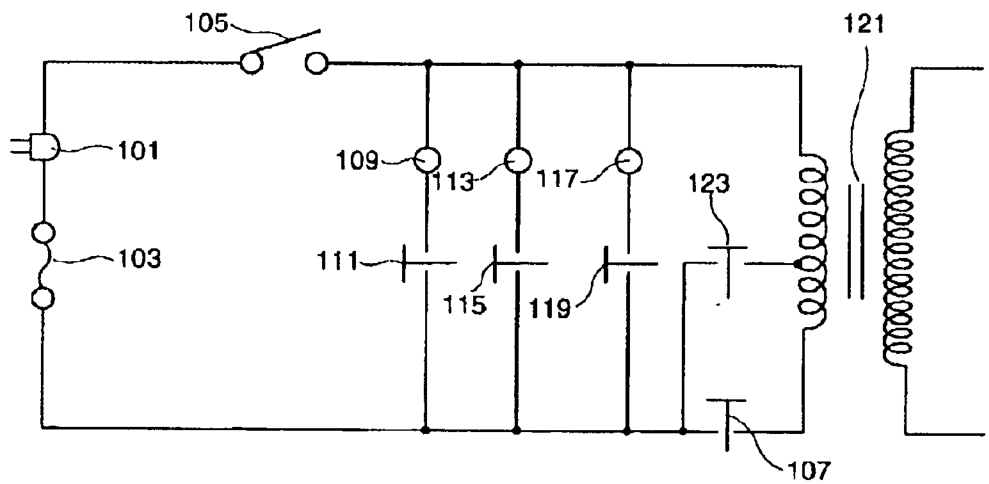
FIG. 3 is a circuit diagram for control of output power of a combination hood and microwave oven according to the present invention.

FIG. 3 is a circuit diagram for control of output power of the combination hood and microwave oven according to the present invention.

A power supply terminal 101 is a terminal for inputting an external voltage into the combination hood and microwave oven. A fuse 103 is connected to the power supply terminal 101. The usable amount of current for the fuse 103 is set depending on the magnitude of the rated amount of current usable in the microwave oven of the present invention. Further, since the fuse 103 is installed at a position closest to the power supply terminal 101, it controls rapid cutoff of the input voltage in a state where excess current flows or abnormal operation occurs.

Moreover, a door switch 105 is connected to the power supply terminal 101. The door switch 105 is a switch interlocked with opening of a door of the microwave oven. That is, when the door is opened, the door switch 105 is turned off to cut off electric power supplied to respective components.

Components for controlling an operation of the microwave oven are connected in parallel to the power supply terminal 101. Reference numeral 109 is a vent fan. The vent fan 109 is provided only in such a combination hood and microwave oven so that it can be used for ventilation. Further, the vent fan 109 is used for ventilation of fumes, water vapors and the like generated from the microwave oven and also utilized even during the operation of cooking equipment installed below the microwave oven in accordance with selection of a user. That is, the vent fan 109 can be used separately from the operation of the microwave oven.

However, the vent fan 109 is not always operated in the present invention. The present invention selectively limits the operation of the vent fan 109. In such a case, the operation of the vent fan 109 is electrically controlled so that the vent fan cannot be operated when high output power is required, e.g., in a quick cooking menu.

The operation of the vent fan 109 is controlled by a relay 111. The relay 111 is controlled by a control unit to be described later. That is, when the user selects the use of the vent fan 109, the relay 111 is operated under the control of the control unit and thus the vent fan 109 is operated. The present invention does not allow the vent fan 109 to be operated in the quick cooking menu under the control of the control unit even when the user selects the operation of the vent fan 109.

A cook top lamp 113 is connected in parallel to the vent fan 109. The lamp 113 is an electric indicator lamp. Namely, when the vent fan 109 is selected and thus operated in a case where cooking is performed in the cooking equipment installed below the microwave oven and/or cooking is performed in the microwave oven, the lamp 113 serves to perform a function of indicating the operation of the vent fan. The electric indicator lamp 113 is installed in a front face of the combination hood and microwave oven.

The operation of the electric indicator lamp 113 is controlled by a relay 115. The operation of the relay 115 is also controlled by the separate control unit. When the relay 115 is turned on, the electric power is supplied to the electric indicator lamp 113 which in turn is turned on.

Furthermore, a turntable 117 is connected in parallel to the lamp 113. The turntable 117 is a rotary table within a cooking chamber of the microwave oven. When the turntable is rotated, cooking materials is allowed to uniformly receive a high-frequency wave. The operation of the turntable 117 is controlled by a relay 119. The operation of the relay 119 is also controlled by the separate control unit.

A high voltage transformer 121 is arranged to be connected in parallel to the above components. The high voltage transformer 121 shown in FIG. 3 has a configuration in which the number of windings of a primary coil of the high voltage transformer 121 can be adjusted. That is, as shown in FIG. 3, the high voltage transformer 121 is configured such that its operation is controlled by relay I 107 or relay II 123.

Figure 4:
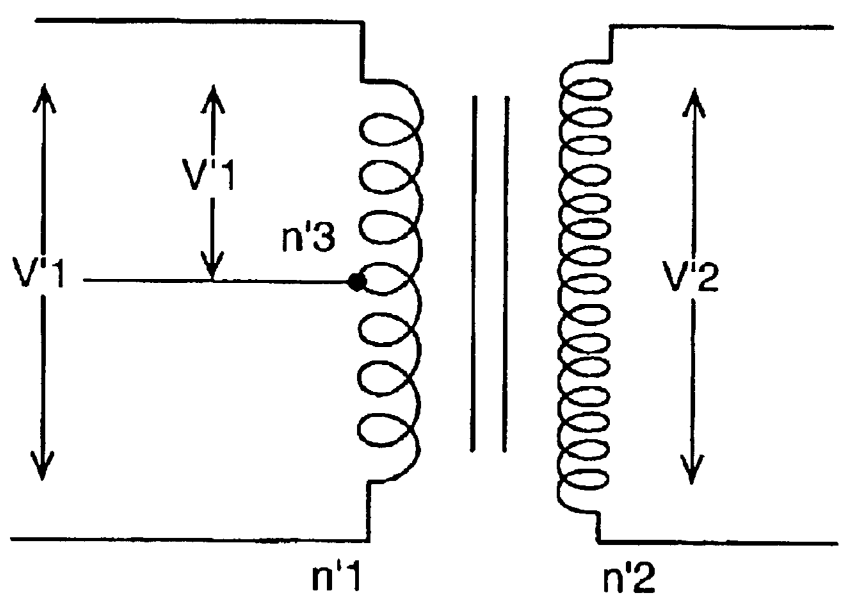
FIG. 4 is a view showing a configuration of a high voltage transformer according to a first embodiment of the present invention.

If relay I 107 is selected and thus operated, the number of windings of the primary coil of the high voltage transformer 121 becomes n'1 as shown in FIG. 4. However, if relay II 123 is selected and thus operated, the number of windings of the primary coil of the high voltage transformer 121 becomes n'3 which is relatively smaller than that of the former. Therefore, the former obtains a low voltage at a secondary side of the transformer in accordance with the relationship (1), whereas the latter obtains a high voltage at the secondary side relatively higher than that of the former.

Further, the number of windings of the coil for variably controlling an output level of the high voltage transformer 121 of the present invention is adjusted depending on a value of power consumption assigned to the high voltage transformer 121. As an example, if total usable current consumption is 20A, a current assigned to the vent fan 109 is 3A, and a current assigned to components except the high voltage transformer is 5A, a current to be assigned to the high voltage transformer becomes 12A. However, if the use of the vent fan 109 is interrupted, the current assigned to the high voltage transformer can be set to 15A. That is, the number of windings of the coil is configured such that the variably adjustable output level of the high voltage transformer 121 can be variably adjusted depending on 12A or 15A.

In a kind of combination hood and microwave oven, the currents of 13.7A, 0.3A, 1.2A and 0.5A are actually assigned to the high voltage transformer, an oven lamp, the vent motor, and the cook top lamp, respectively. At this time, a maximum threshold current of the product is set to about 13 to 15A. Therefore, if the use of the vent motor and the cook top lamp is interrupted even in such a case, it is possible to increase a value of the current usable in the high voltage transformer.

Further, although not shown at the secondary side of the high voltage transformer 121, the magnetron is provided thereat for performing high-frequency oscillation in proportion to the magnitude of the voltage at the secondary side of the high voltage transformer 121.

Although the relays have been described as being used as driving elements for opening and closing the supply line of the electric power to the electric parts in the above configuration, the driving elements in the present application are not limited to the relays. Any kinds of switch elements suitable for the driving elements for opening and closing the supply line of the electric power may be employed.

Figure 9:
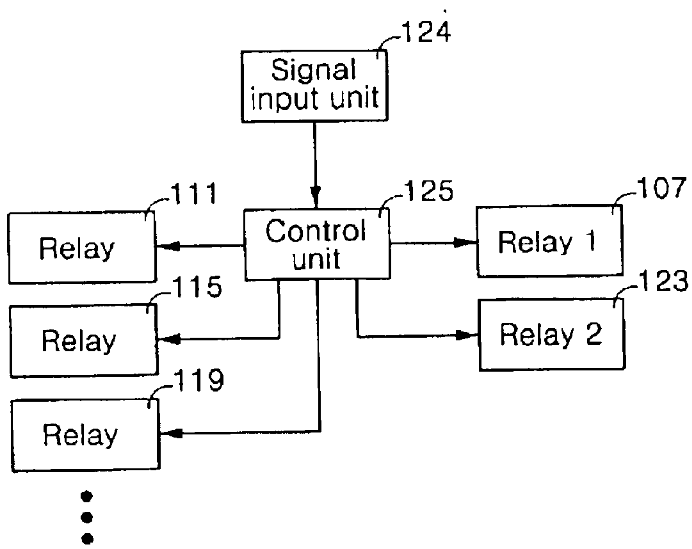
FIG. 9 is a block diagram for control of relay I and relay II depending on whether a vent fan is operated in the present invention.

Meanwhile, FIG. 9 shows a block diagram for control of the relays of the high voltage transformer. In such a configuration, a control unit 125 determines whether the vent fan 109 is operated, and then, controls the operation of relay I 107 or relay II 123. That is, the control unit 125 causes relay I 107 to operate when the vent fan 109 is in operation but relay II 123 to operate when the vent fan 109 is not in operation.

Preferably, whether the vent fan 109 is operated is determined in such a manner that the control unit 125 stores a driving signal for the relay 111 used to operate the vent fan and confirms the stored information when controlling relay I 107 and relay II 123 depending on control of cooking using the magnetron.

In addition to the above control, the control unit 125 controls the operations of the relays 111, 115 and 119 for controlling operations of various kinds of electric parts installed in the product. Reference numeral 124 designates a signal input unit for inputting command signals for various cooking operations and control operations in the microwave oven. The input signals of the signal input unit 124 are transmitted to the control unit 125 so that the control unit 125 determines operation signals selected by the user and performs the control based on the determination.

An operation process of the combination hood and microwave oven according to the present invention constructed as such will be described hereinafter.

In a state where the door 105 is closed, the electric power inputted through the power supply terminal 101 is supplied to all the components connected thereto in parallel. The respective components are operated depending on the operation state of the relays for controlling the operations of the components.

If the user selects a function of ventilation, the control unit 125 which has detected the selection causes the relay 111 to operate so that the operation of the vent fan 109 is performed. When the vent fan 109 is operated, fumes or water vapors generated from the microwave oven and/or cooking equipment are discharged to the outside by means of airflow produced by the operation of the vent fan 109.

At this time, the relay 115 for controlling the operation of the electric indicator lamp 113 is also operated simultaneously so that the electric power is supplied to the electric indicator lamp 113 which in turn is turned on.

Further, when cooking is performed in the microwave oven, the relay 119 is turned on under the control of the control unit 125. As the relay 119 is turned on, the electric power is supplied to the turntable 117 which in turn is rotated.

In such cooking control, if the magnetron should be used in the cooking, relay I 107 or relay II 123 is controlled to be turned on and then a high voltage is induced in the high voltage transformer 121. The high voltage generated as such allows the magnetron to generate a high-frequency output power.

Next, an operation process of variably controlling the output level of the high voltage transformer in the present invention will be described.

Figure 7:
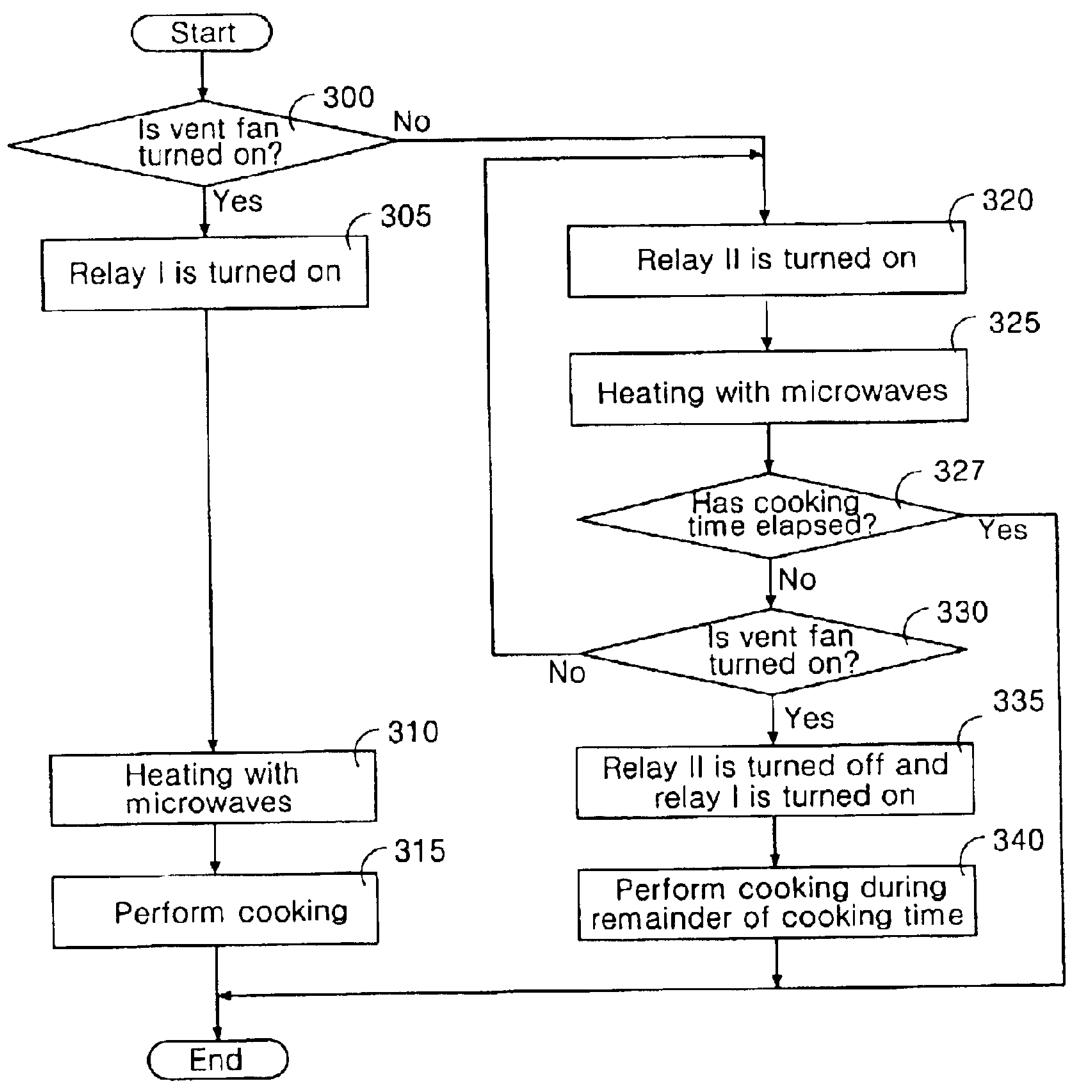
FIG. 7 is a flowchart illustrating a process of controlling relay I and relay II in the present invention.

FIG. 7 shows a flowchart illustrating an operation process of the relays for controlling the operation of the high voltage transformer in the combination hood and microwave oven according to the present invention.

Before performing the cooking, the control unit 125 confirms as to whether the vent fan 109 is operated (step 300).

If it is confirmed in step 300 that the vent fan 109 is in operation, the control unit 125 sets relay I 107 as a relay for use in supply of the electric power to the high voltage transformer 121. That is, the control unit causes relay I 107 to be turned on so that a voltage is applied to the high voltage transformer 121 (step 305).

At this time, the primary side of the high voltage transformer 121 induces a high voltage at the secondary side thereof from the primary coil having the number of windings n'1 and a voltage V'1. Here, the induced voltage at the secondary side is in a relative low value state, i.e. a state adjusted according to a low value of current (12A in the aforementioned example) resulting from the driving of the vent fan.

The induced voltage at the secondary side of the high voltage transformer 121 is applied to the magnetron (not shown) which in turn generates microwaves. Under such control conditions, the cooking is performed (steps 310 and 315).

However, if it is confirmed in step 300 that the vent fan 109 is not in operation, the control unit 125 causes relay II 123 to be turned on (step 320). Here, the voltage is applied to the primary side of the high voltage transformer 121 through relay II 123.

At this time, the primary side of the high voltage transformer 121 induces a high voltage at the secondary side thereof from a primary coil having the number of windings n'3 and the voltage V'1. Here, the induced voltage at the secondary side is in a relative high value state, i.e. a state adjusted according to a high value of current (15A in the aforementioned example) resulting from the non-driving of the vent fan.

The induced voltage at the secondary side of the high voltage transformer 121 is applied to the magnetron (not shown) which in turn generates microwaves. Under such control conditions, the cooking is performed during a predetermined period of time (steps 325 and 327).

However, while the cooking is performed during the predetermined period of time in step 327, the control unit 125 continues to monitor whether the vent fan is turned on and operated (step 330). Further, while the vent fan is not in operation within the predetermined period of time, the operation of the magnetron is performed under the present control conditions, i.e. with the high voltage generated by the high voltage transformer 121 through the ON operation of relay II 123.

Moreover, if the vent fan 109 is operated during the cooking time in step 330, the control unit 125 switches off relay II 123 and switches on relay I 107 (step 335).

Then, the cooking is performed for the remainder of the cooking time under the control conditions of step 335 (step 340). Of course, since the voltage generated by the high voltage transformer 121 is relatively low in step 340, a proper compensation for the cooking time should be made in proportion to the relatively low voltage.

That is, according to the present invention, the primary side of the high voltage transformer 121 is further provided with one terminal and a control relay. At this time, since the input voltage V'1 is an inherent voltage, it is kept to be same.

Therefore, if relay I 107 is caused to be turned on and relay II 123 is caused to be turned off, a relatively low voltage is induced at the secondary side of the high voltage transformer 121. At this time, the vent fan 109 can be operated simultaneously.

Further, if relay II 123 is turned on, the number of windings of the coil at the primary side of the high voltage transformer 121 is smaller than that in a case where relay I 107 is turned on. Thus, the induced voltage at the secondary side of the high voltage transformer 121 is relatively higher than that in the above case. Accordingly, the output power of the magnetron is increased. As a result, since the current consumption is increased in this case, the vent fan 109 should be turned off.

Therefore, if the vent fan starts to be operated while the high voltage transformer is operated with the high output level in a state where the vent fan is not in operation, or the current consumption is increased due to the operations of the other components, the control unit 125 automatically switches the control element for the high voltage transformer 121 from relay II to relay I. With such control, the combination hood and microwave oven can be utilized without an excess of the current consumption over a rated current.

Figure 8:
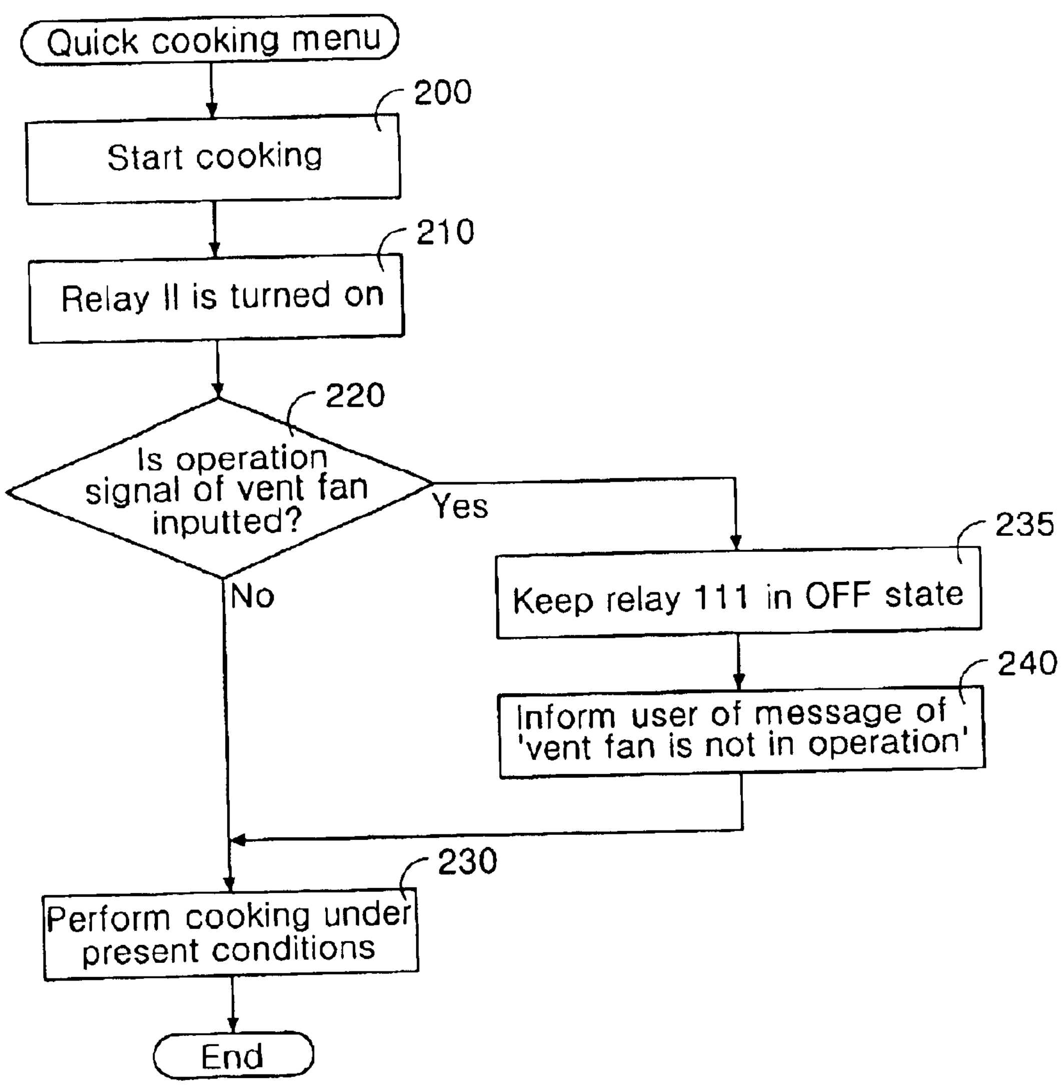
FIG. 8 is a flowchart illustrating a process of controlling an operation for a quick cooking menu in the present invention.

Next, FIG. 8 illustrates a control process of limiting the operation of the vent fan in the quick cooking menu in the combination hood and microwave oven according to the present invention.

In the quick cooking menu in which the cooking is performed for a short period of time and with high output power (step 200), the control unit 125 can control the operation of the vent fan 109 to be interrupted for the short period of time since the cooking time is short.

In other words, when the quick cooking menu is performed, the control unit 125 causes relay II 123 to be turned on (step 210) and the cooking to be performed with the generated high output power (step 230).

If a driving signal for the vent fan is inputted by the user's request while the cooking is performed (step 220), the control unit 125 forcibly causes the relay 111 to be in the OFF state (step 235). Then, the control unit 125 informs the user that the vent fan is not in operation at present by outputting a message of 'vent fan is not in operation' onto a display unit of a display panel, using an indicator lamp, or the like (step 240).

Figure 5:
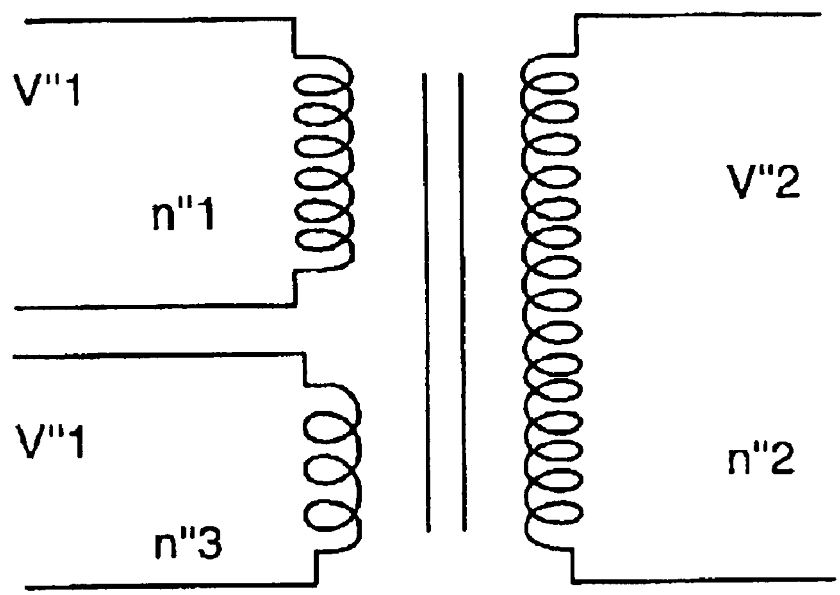
FIG. 5 is a view showing a configuration of a high voltage transformer according to a second embodiment of the present invention.
Figure 6:
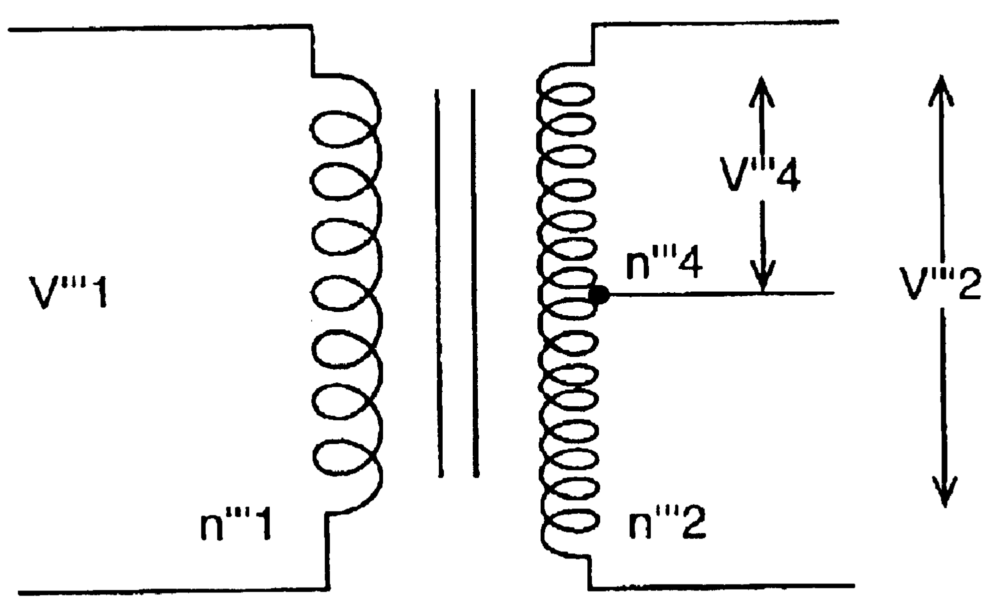
FIG. 6 is a view showing a configuration of a high voltage transformer according to a third embodiment of the present invention.

Next, FIGS. 5 and 6 show configurations of high voltage transformers according to other embodiments of the present invention.

In the embodiment shown in FIG. 5, since the number of windings n"1 is set to be larger than the number of windings n"3, the induced voltage at the secondary side upon supply of a primary voltage to a primary coil having the number of windings n"1 is relatively lower than that in a case where the primary voltage is applied to a primary coil having the number of windings n"3. Therefore, in such a case, the primary voltage is applied to the primary coil having the number of windings n"1 when the vent fan is in operation but to the primary coil having the number of windings n"3 when the vent fan is not in operation.

The embodiment shown in FIG. 6 is a case where the number of windings at the secondary side is adjusted. Even in such a case, the secondary voltage can be induced as different secondary voltages V'"4, V'"2. In this case, the voltage V'"2 is induced to be higher than the voltage V'"4. In the embodiment shown in FIG. 6, relays should be configured to adjust the number of windings at the secondary side of the high voltage transformer. That is, the relays should be configured such that the control unit can select the secondary voltage V'"4 or V'"2.

Figure 10A:
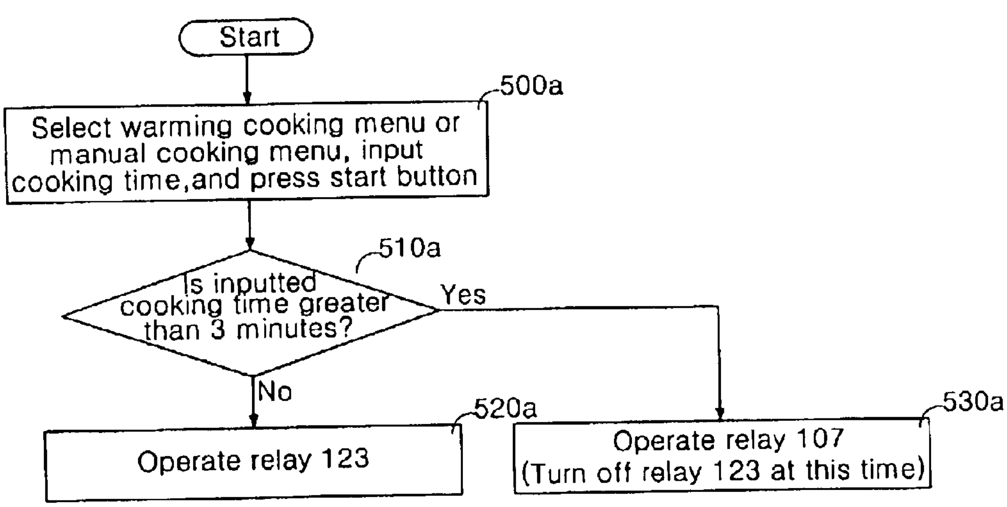
FIGS. 10*a* and 10*b* are flowcharts illustrating early control of high output power for warming cooking in the combination hood and microwave oven according to the present invention.

FIG. 10*a* is a flowchart illustrating an operation process of variably controlling the output of the high voltage transformer during a warming cooking menu in the combination hood and microwave oven according to the present invention.

The warming cooking or short time manual cooking menu is usually performed in the microwave oven in a short time, e.g. 2 or 3 minutes. Within such a short period of time, high output control for generating the output higher than a rated output from the high voltage transformer can be made without any damage to the magnetron. Therefore, the time during which the high output control can be made is preferably limited within a predetermined early period of time in which the magnetron has not yet been overheated. The period of time is determined according to capacity of the magnetron based on test results thereof.

For example, if the user selects the warming or manual cooking menu, sets the cooking time for the selected cooking menu, and presses a start button through the signal input unit 124 (step 500*a*), signals for the selected cooking menu, the cooking time, cooking start instructions, and the like are inputted into the control unit 125.

The control unit 125 decodes and recognizes the inputted signals. It is also determined whether the selected cooking menu can be performed under the high output control based on the signals inputted in step 500*a*. The cooking menu that can be performed under the high output control is determined based on the cooking menu, the cooking time, and the like. The cooking menu that can be performed under the high output control corresponds to a case where the warming or manual cooking is set to be made for a short cooking time. Step 510*a* of FIG. 10*a* is a step of determining whether the high output control can be performed according to the aforementioned procedures. That is, in step 510*a,* it is determined that the cooking can be made under the high output control when the cooking time for the selected cooking menu is within a predetermined period of time (3 minutes) in which the high output control can be performed.

If it is determined in step 510*a* that the selected cooking menu can be performed under the high output control, the control unit 125 turns on the relay 123 and increases the output of the high voltage transformer 121 (step 520*a*).

However, it is determined in step 510*a* that the selected cooking cannot be made under the high output control, the control unit 125 turns on the relay 107 and keeps the high voltage transformer 121 at its normal output level (step 530*a*).

On the other hand, the following control may be performed as another example. That is, the control unit 125 turns on the relay 123 and increases the output of the high voltage transformer 121 during the time in which the high output control can be performed. Then, the control unit 125 turns the relay 123 off and the relay 107 on, and keeps the high voltage transformer 121 at its normal output level after an elapse of the time in which the high output control can be performed.

Figure 10B:
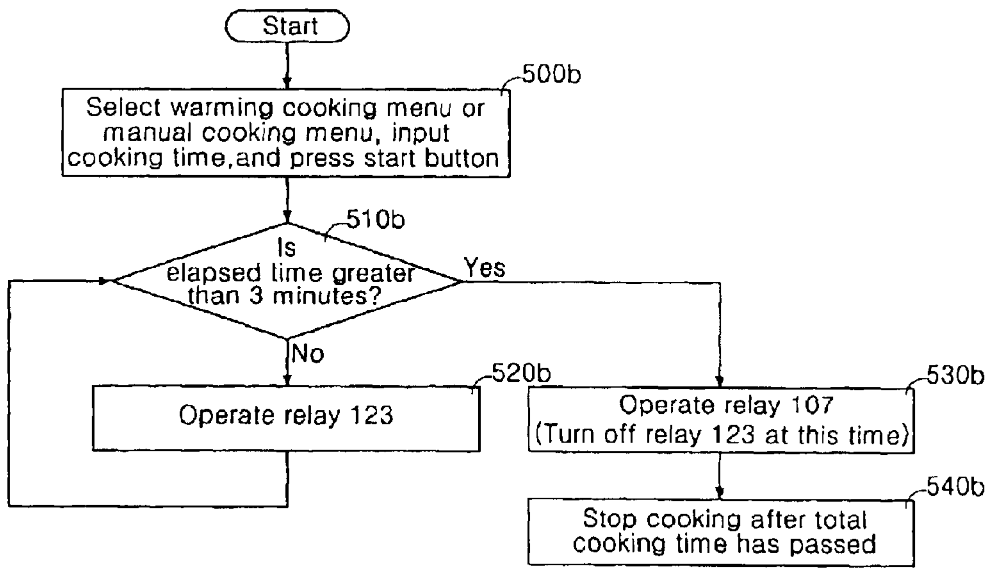

In other words, as shown in FIG. 10*b*, when the selected menu corresponds to either the warming cooking menu or the manual cooking menu (step 500*b*), the control unit 125 causes the relay 123 to operate during the predetermined time (about 3 minutes) so that the transformer 121 operates at its high output level (steps 510*b* and 520*b*).

Further, after the predetermined time (about 3 minutes) has passed, the control unit 125 turns the relay 123 off and the relay 107 on (step 530*b*). Therefore, the output of the transformer 121 in step 530*b* can be relatively lower than that in step 520*b*.

Such an operation is performed until a total cooking time selected in step 500*b* has passed. That is, if it is determined in step 510*b* that the cooking time during which the relay 123 is turned on reaches the predetermined time (about 3 minutes), the cooking is made under the condition that the relay 107 is instead turned on during the remainder of the cooking time (step 540*b*).

Figure 11:
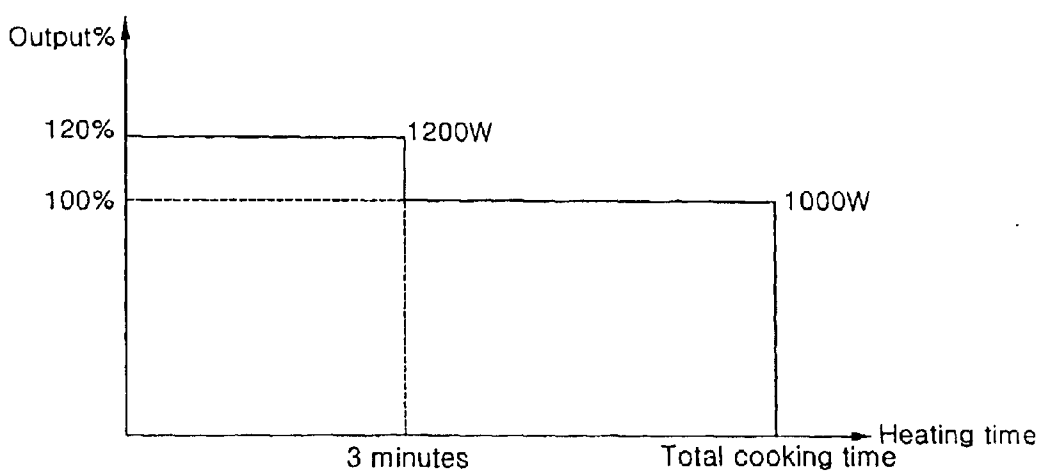
FIG. 11 is a graph showing the output power in FIG. 10*b;*

FIG. 11 is a graph showing the output of the transformer 121 when the cooking is made according to the process of FIG. 10*b*. That is, about 120% output greater than the rated output of the transformer 121 corresponding to about 1200 W of the microwave oven, is generated during the initial 3 minutes, whereas the output of the transformer 121 is reduced to 100% of the rated output thereof and thus about 1000 W of the microwave oven is generated after the three minutes have passed.

According to the combination hood and microwave oven of the present invention, the high voltage transformer 121 for generating the voltage supplied to the magnetron is constructed to be an output-variable type, and the high output control is performed in the predetermined early period of time.

Figure 12:
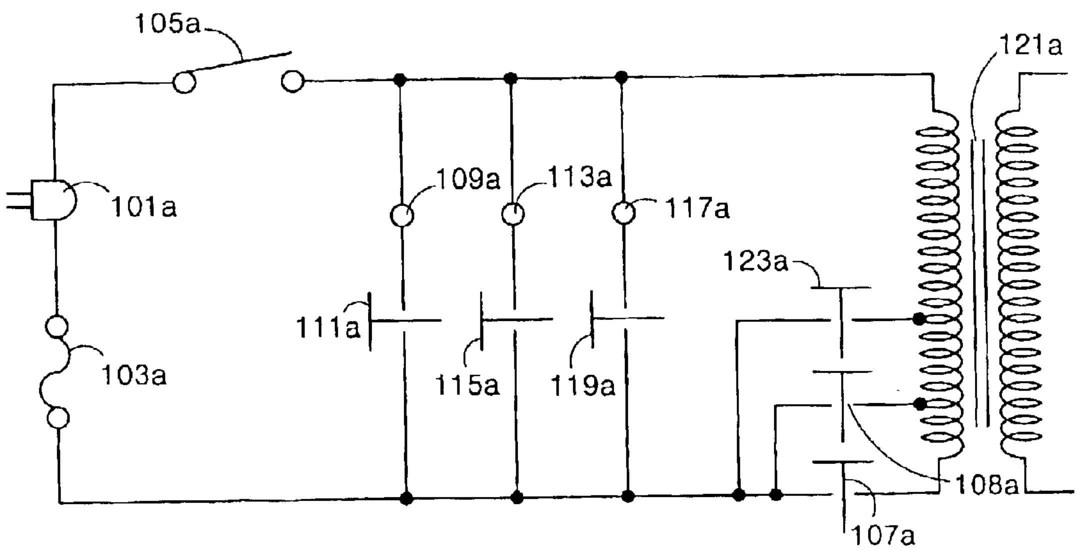
FIG. 12 is a circuit diagram for control of output power of a combination hood and microwave oven according to a fourth embodiment of the present invention.

FIG. 12 shows a circuit diagram for control of the output power of the combination hood and microwave oven according to a fourth embodiment of the present invention.

The illustrated fourth embodiment of the present invention shows three-stage control of the variable output of a transformer 121*a* rather than two-stage control thereof. That is, two terminals are further provided to a primary winding of the transformer 121*a*, and thus, two additional relays are connected to the terminals, respectively. In the embodiment, total three relays are employed. In such a case, the maximum output of the transformer 121*a* is generated when the relay 123*a* is turned on, whereas the minimum output of the transformer 121*a* is generated when the relay 107*a* is turned on. Further, a medium output of the transformer 121*a* is generated when the relay 108*a* is turned on.

Next, a cooking control process in which multi-stage control of the output of the transformer 121*a* is performed will be explained with reference to FIG. 13.

Frozen food such as frozen pizza is in a frozen state just before cooking. If the cooking is made in the frozen state, it takes a long time to finish cooking the frozen food or it is difficult to obtain an optimally cooked state of the food due to a low rate of absorption of the microwaves into the food. Therefore, it is preferable to cook the frozen food such as the frozen pizza after thawing the frozen food in the microwave oven during a predetermined period of time.

That is, the user puts the frozen pizza into a cooking chamber of the microwave oven and selects the cooking menu (may select weight, size or the like, if necessary) (step 400), the control unit 125 calculates the total cooking time based on the weight and type of the food to be cooked and causes the calculated total cooking time to be displayed onto the display unit (not shown) (step 410).

The control unit 125 retrieves a cooking algorithm of the selected cooking menu. The cooking algorithm is previously stored into a memory within the control unit 125. The cooking algorithm includes or stores output values of the transformer related to the total cooking time, which are classified according to product specifications (e.g., the variable-output type of transformer).

Figure 13:
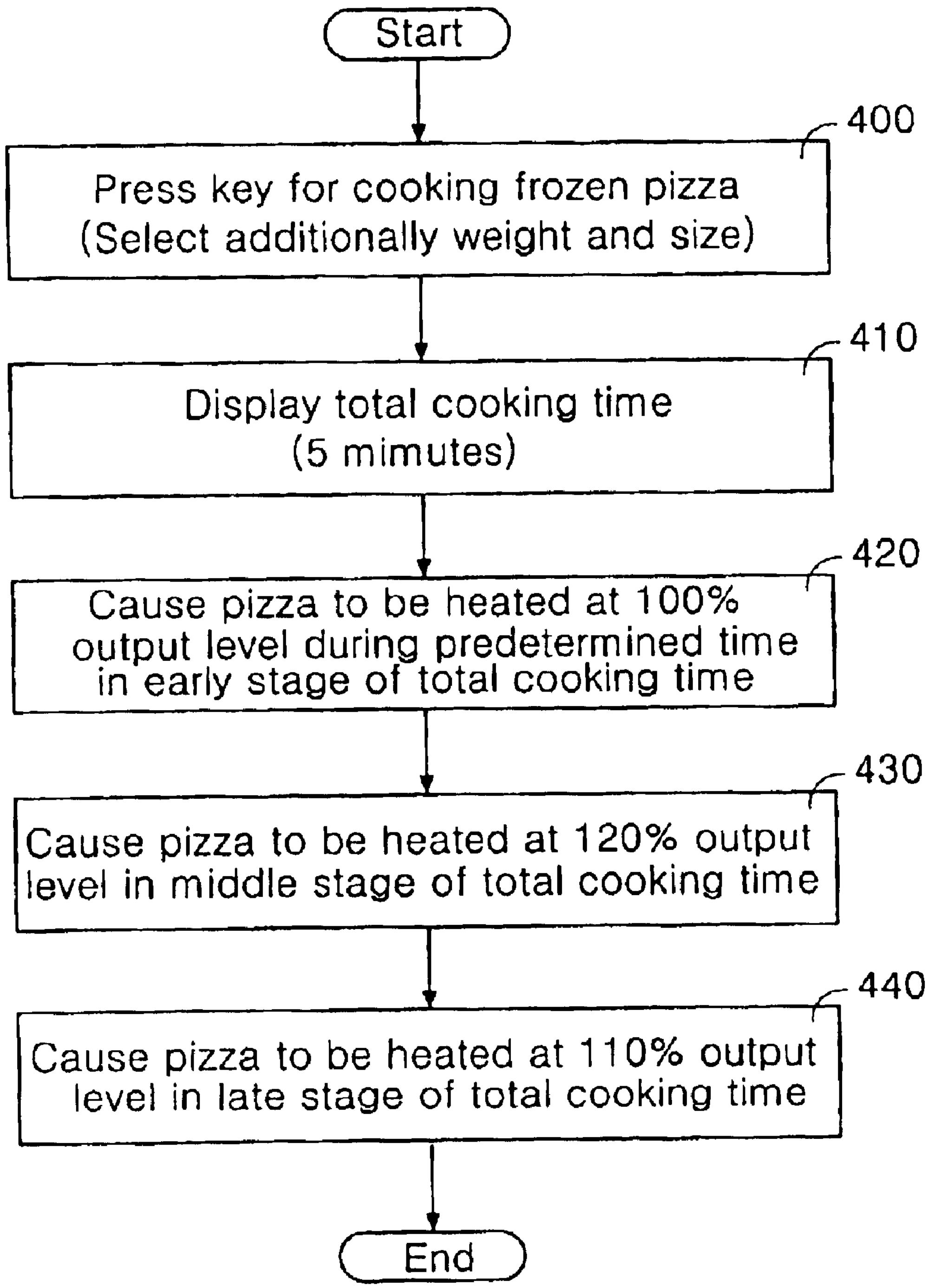
FIG. 13 is a flowchart illustrating an operation for the control of the output power in the combination hood and microwave oven according to the fourth embodiment of the present invention.

As shown in FIG. 13, the transformer 121*a* is first controlled to generate the 100% output during the predetermined early period of time (about 30%) among the total cooking time (step 420). Step 420 corresponds to a process of thawing the frozen food. In step 420, the primary side of the transformer 121*a* is connected through the relay 107*a*. That is, the number of windings of the primary coil becomes a maximum value so that the output of the transformer is lowered to the minimum.

After the predetermined period of time has passed, the transformer 121*a* is then controlled to generate a maximum output (about 120% of the rated output thereof) during another predetermined period of time (about 60%) of the total cooking time (step 430). Step 430 corresponds to a process of cooking the pizza thawed in step 420. In step 430, the primary side of the transformer 121*a* is connected through the relay 123*a*. At this time, the number of windings of the primary coil becomes a minimum value so that the output of the transformer is increased to the maximum. The cooking is mostly performed under the control in step 430.

Finally, the transformer 121*a* is controlled to generate the medium output (about 110% of the rated output thereof) during a further predetermined period of time (about 10%) of the total cooking time (step 440). In step 440, the primary side of the transformer 121*a* is connected through the relay 108*a*. At this time, the output of the transformer is kept at a medium value.

The microwave oven with a sensor installed therein is controlled such that reference values in the respective stages (e.g., temperature, humidity, etc.) are determined in accordance with a sensor algorithm and the respective stages can be controlled until respective values sensed in the respective stages reach the determined reference values. Alternatively, the microwave oven without a sensor installed therein may be controlled on the basis of a fixed time previously programmed.

Figure 14:
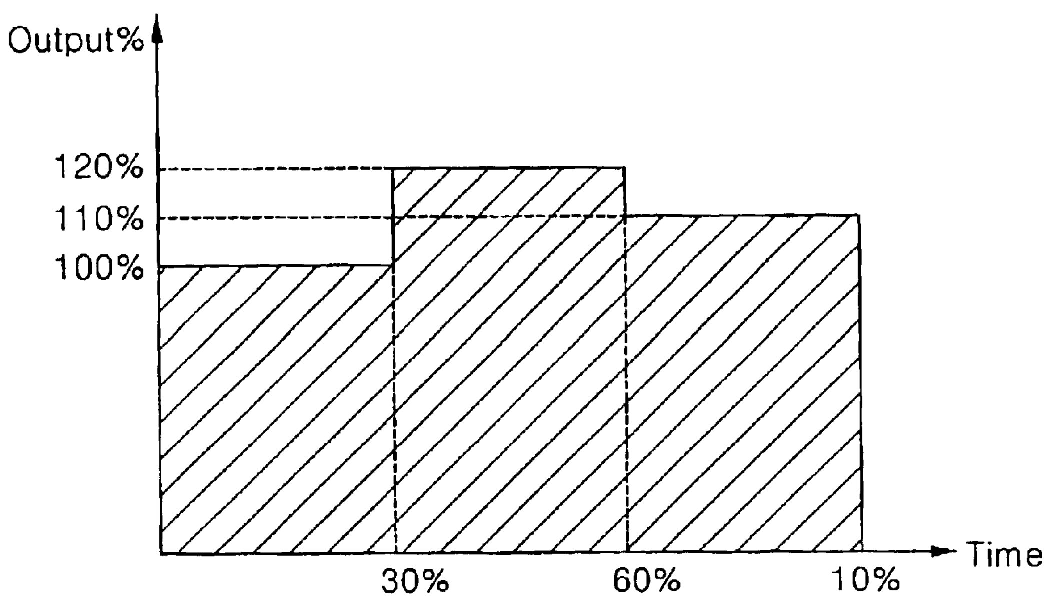
FIG. 14 is a graph showing the output power in FIG. 13.

FIG. 14 is a graph exemplarily showing the output power of the combination hood and microwave oven according to the embodiment of the present invention shown in FIG. 13. In the illustrated embodiment, the respective reference values for controlling the respective stages (e.g., operating times and output levels in the respective stages) are determined on the basis of empirical values obtained by a plurality of tests performed according to the cooking menus.

According to the aforementioned combination hood and microwave oven of the present invention, the output of the transformer can be variably adjusted and a variety of multi-stage control thereof can be performed according to the cooking algorithm or the like.

In the present invention, it is a major technical feature that the output power of the combination hood and microwave oven can be variably adjusted by adjusting the numbers of windings of the primary and secondary coils of the transformer.

According to the combination hood and microwave oven of the present invention, the electric power supplied to the high voltage transformer can be increased by temporarily turning off the parts (limited to the components which can be controlled separately from the microwave oven function), such as the vent fan or the electric indicator lamp, having large power consumption. Thus, the output power level thereof can be increased.

Therefore, there are advantages in that the quick cooking can be made and cooking performance can be improved due to the high output of the transformer, when the user intends to make the quick cooking with the high output power.

Further, there is another advantage in that purchasing power of a consumer can be enhanced since the output level of the transformer can be variably adjusted at lower production costs as compared with the inverter type microwave oven.

Furthermore, since the output control of the high voltage transformer of the present invention is automatically made by the control unit depending on whether the vent motor is operated, the user can conveniently use the combination hood and microwave oven without any danger and trouble.

Although it has been described in the preferred embodiments of the present invention that the output control of the transformer is made depending on whether the vent fan 109 is operated, the present invention is not limited thereto. The output control of the transformer may be made in consideration of the operation of the other components such as the electric indicator lamp 113 operating when the combination hood and microwave oven functions as a hood. Further, when the combination hood and microwave oven functions as a microwave oven, the cooking can be made using only a heater, only the magnetron, and both the heater and the magnetron. Therefore, if the present invention is constructed to control the magnetron and the heater separately, it is possible to variably adjust the current usable in the transformer by further using the currents for the other components.

It is apparent to a person skilled in the art that various changes or modifications can be made without departing from the spirit and scope of the invention.

What is claimed is:

1. A method for controlling output power of a combination hood and microwave oven including a vent fan for ventilation, a high voltage transformer configured to generate high voltages having different magnitudes at a secondary side of the high voltage transformer within a range of power consumption of the microwave oven, a magnetron for outputting high-frequency waves with the high voltages induced at the secondary side of the high voltage transformer and a plurality of switches for controlling current passages at a primary side of the high voltage transformer by differently controlling the number of windings at the primary side of the high voltage transformer, comprising:

the first step of selecting a cooking menu;

the second step of determining whether the vent fan is operated; and the third step of operating a switch for a first high, maximum output level of the high voltage transformer when the vent fan is not in operation but another switch for a second high output level lower than the first high output level of the high voltage transformer when the vent fan is in operation, wherein the third step is performed while monitoring the operation of the vent fan during a predetermined cooking time for the selected cooking menu.

2. A method for controlling output power of a combination hood and microwave oven including a vent fan for ventilation, a high voltage transformer configured to generate high voltages having different magnitudes at a secondary side of the high voltage transformer which are within a range of power consumption of the microwave oven, and a magnetron configured to output high-frequency waves with the high voltages generated at the secondary side of the high voltage transformer, the method comprising:

selecting a cooking menu;

determining if the selected cooking menu can be performed in a high output power control mode; and producing a maximum output level in the high voltage transformer for a predetermined period of time when it is determined that the cooking menu can be performed in the high output power control mode, and producing a lower output level in the high voltage transformer during the predetermined period of time when it is determined that the cooking menu cannot be performed in the high output power control mode.

3. A method for controlling output power of a combination hood and microwave oven including a vent fan for ventilation, a high voltage transformer configured to generate high voltages having different magnitudes at a secondary side of the high voltage transformer which are within a range of power consumption of the microwave oven, and a magnetron configured to output high-frequency waves with the high voltages generated at the secondary side of the high voltage transformer, the method comprising:

selecting a cooking menu; and performing a cooking operation, comprising:

producing a maximum output level in the high voltage transformer during a first predetermined period of time based on an algorithm associated with the selected cooking menu;

thereafter adjusting an output level of the high voltage transformer to a lower value; and continuing to perform the cooking operation at the lower value for a second predetermined period of time based on the algorithm associated with the selected cooking menu.

4. A method for controlling output power of a combination hood and microwave oven including a vent fan for ventilation, a high voltage transformer configured to generate high voltages having different magnitudes at a secondary side of the high voltage transformer within a range of power consumption of the microwave oven, and a magnetron for outputting high-frequency waves with the high voltages induced at the secondary side of the high voltage transformer, comprising the steps of:

selecting a cooking menu;

if the selected cooking menu is a cooking menu requiring high output power control, performing cooking with a maximum output level of the high voltage transformer;

monitoring an operation of the vent fan; and forcibly interrupting the operation of the vent fan if an operation signal of the vent fan is inputted while the cooking is performed.

5. The method as claimed in claim 4, further comprising the step of informing a user that the vent fan is not operated if the operation of the vent fan is forcibly interrupted.

6. A method for controlling an output power level of a combination hood and microwave which includes a vent fan configured to provide ventilation, a high voltage transformer configured to generate high voltages of varying magnitudes at a second side of the high voltage transformer, a magnetron configured to receive the high voltages generated by the high voltage transformer and to output high frequency waves, and a plurality of switches configured to control a plurality of current passages electrically connected to the high voltage transformer, the method comprising:

selecting a cooking option from a cooking menu; and conducting a cooking operation based on the cooking option selected from the cooking menu, comprising:

determining a first output power level required by the magnetron to sustain the cooking operation;

determining a second output power level allocated to the vent fan based on the first output power level required by the magnetron; and selectively operating the plurality of switches based on the first output power level required by the magnetron and the second output power level allocated to the vent fan, and producing the first and second output power levels; and adjusting the output power level required by the magnetron to sustain the cooking operation and reallocating the second output power level allocated to the vent fan as required by the cooking option selected from the cooking menu, and producing the adjusted first and second output power levels.

7. The as claimed in claim 6, wherein operating the plurality of switches further comprises operating a first switch configured to complete a first current passage at the first side of the high voltage transformer to engage a first number of coil windings so as to provide a first level of power to the magnetron.

8. The method as claimed in claim 7, wherein operating the plurality of switches further comprises operating a second switch configured to complete a second current passage at the first side of the high voltage transformer to engage a second number of coil windings which is greater than the first number of coil windings so to provide a second level of power to the magnetron which is less than the first level of power.

9. The method as claimed in claim 8, further comprising operating the first switch when the vent fan is not in operation, and operating the second switch when the vent fan is in operation.

10. The method as claimed in claim 6, wherein the first output power level comprises a maximum output power level if a cooking time associated with the cooking option selected from the cooking menu is less than a predetermined amount of time.

11. The method as claimed in claim 6, wherein producing the first output power level comprises producing a maximum output level during a first predetermined period of time, and then adjusting the output power level to a lower output power level.

12. The method as claimed in claim 6, further comprising:

monitoring operation of the vent fan; and forcibly interrupting operation of the vent fan if an initiation signal is input for the vent fan while conducting the cooking operation.

13. A method for controlling an output power level of a combination hood and microwave which includes a vent fan configured to provide ventilation, a high voltage transformer configured to generate high voltages of varying magnitudes at a second side of the high voltage transformer, a magnetron configured to receive the high voltages generated by the high voltage transformer and to output high frequency waves, and a plurality of switches configured to control a plurality of current passages electrically connected to the high voltage transformer, the method comprising:

selecting a cooking option from a cooking menu; and conducting a cooking operation based on the cooking option selected from the cooking menu, comprising:

determining a first output power level of the transformer and a corresponding first predetermined period of time during which the first output power level is sustained;

determining a second output power level of the transformer and a corresponding second predetermined period of time during which the second output power level is sustained; and determining a third output power level of the transformer and a corresponding third predetermined period of time during which the third output power level is sustained; and selectively operating the plurality of switches to provide the first, second and third output power levels.

14. The method as claimed in claim 13, wherein selectively operating the plurality of switches comprises:

operating a first switch and completing a first current passage to engage a first number of coil windings so as to produce the first output power level;

operating a second switch and completing a second current passage to engage a second number of coil windings so as to produce the second output power level; and operating a third switch and completing a third current passage to engage a third number of coil windings so as to produce the third output power level.

15. The method as claimed in claim 14, wherein the third number of coil windings is greater than the first number of coil windings and less than the second number of coil windings, and wherein the third output power level is greater than the first output power level and less than the second output power level.

* * * * *